(12) United States Patent
Lintilhac et al.

(10) Patent No.: US 6,277,637 B1
(45) Date of Patent: Aug. 21, 2001

(54) METHOD AND APPARATUS FOR DETERMINING A CONTACT AREA BETWEEN A PROBE AND A SPECIMEN

(76) Inventors: Philip M. Lintilhac, 100 Harbor Rd., Shelburne, VT (US) 05401; John O. Outwater, 62 Overlake Park, Burlington, VT (US) 05401

( * ) Notice: Subject to any disclaimer, the term of this patent is extended or adjusted under 35 U.S.C. 154(b) by 0 days.

(21) Appl. No.: 09/274,520

(22) Filed: Mar. 23, 1999

Related U.S. Application Data

(63) Continuation of application No. PCT/US97/17442, filed on Sep. 30, 1997.
(60) Provisional application No. 60/027,392, filed on Sep. 30, 1996.

(51) Int. Cl.[7] .................................................. C12N 5/00
(52) U.S. Cl. ......................... 435/410; 435/1.1; 435/420
(58) Field of Search ............................ 435/1.1, 420, 410

(56) References Cited

PUBLICATIONS

Derwent WPI Abstract of SU 1766363.

*Primary Examiner*—Leon B. Lankford, Jr.
(74) *Attorney, Agent, or Firm*—Baker Botts L.L.P.

(57) ABSTRACT

Turgor pressure is measured in a cellular sample by contacting the sample with a convex probe, measuring the area of contact and using a formula to convert the area into turgor pressure.

15 Claims, 2 Drawing Sheets

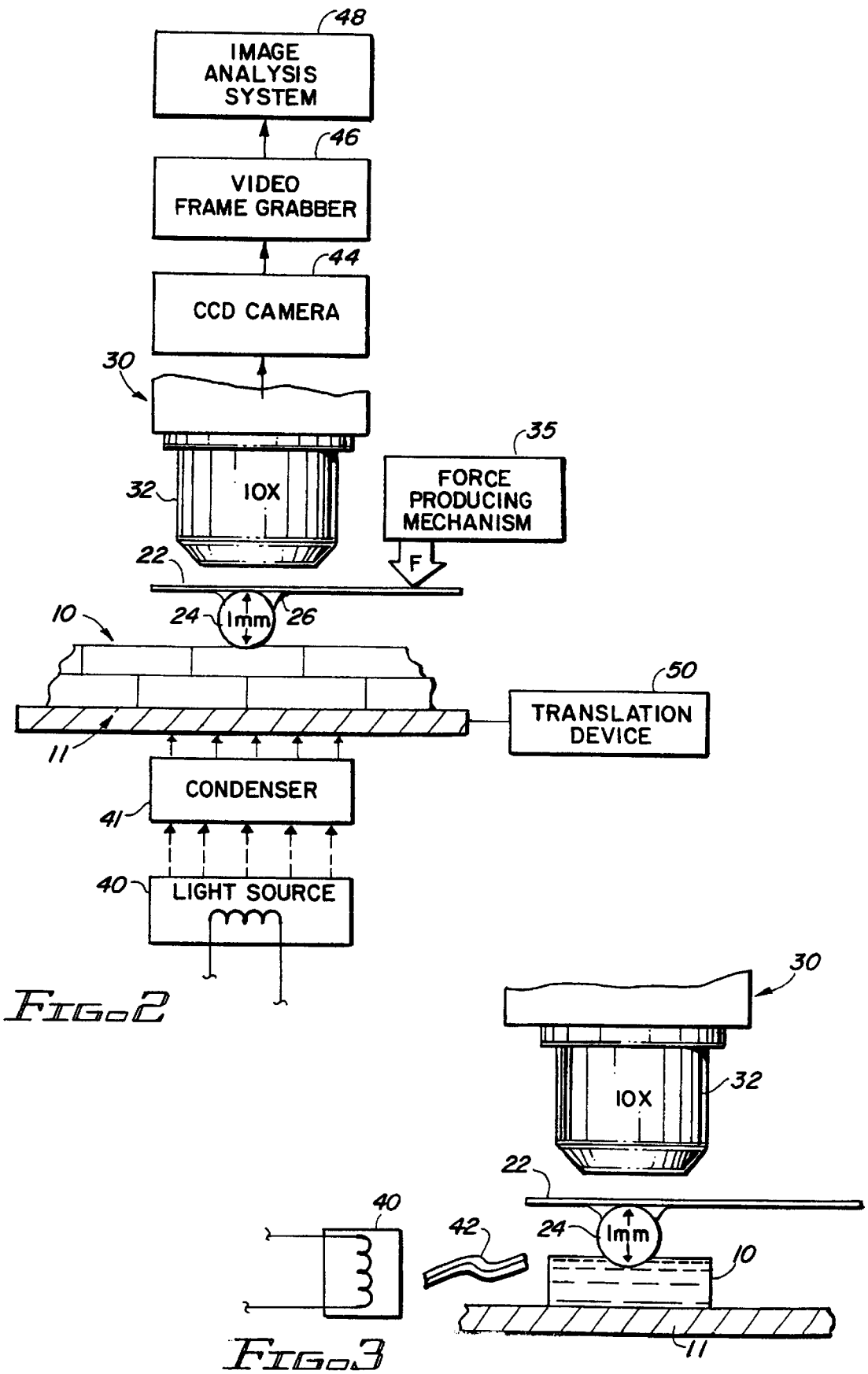

METHOD AND APPARATUS FOR DETERMINING A CONTACT AREA BETWEEN A PROBE AND A SPECIMEN

This is a continuation of copending PCT application No. PCT/US971/17442 filed Sep. 30, 1997 (now PCT Publication WO 98/14754), which claims priority from U.S. application Ser. No. 60/027,392, filed Sep. 30, 1996.

FIELD OF THE INVENTION

This invention relates to methods and apparatus for measuring turgor pressure of a cell or cells by determining the area of contact between a probe and a specimen, and more particularly to an instrument including a transparent mechanical probe and its use to view the area of its contact with a specimen.

BACKGROUND OF THE INVENTION

A characteristic of a deformable specimen that can be related to area of contact between a mechanical probe and the specimen is the turgor pressure of a cell. Growing plants are hydrostatic structures. Plant form is maintained by turgor pressure. In most of the biomechanics of plant growth, an understanding requires some knowledge of turgor pressure changes to determine the physical properties of the plant, such as yield threshold and wall modulus. However, turgor pressure is not readily measured in a nondestructive, non-invasive way.

Traditional approaches for determining turgor pressure in plant cells were conducted using either an incipient plasmolysis method, a pressure bomb method, or a micropipette-pressure-probe or "micropressure probe" method (see Park S. Nobel, Physicochemical and Environmental Plant Physiology, 103, 176–180, Academic Press Inc., New York, 1991). These traditional methods are laborious and subject to artefactual error. For example, the incipient plasmolysis method is highly subjective, and it radically alters the environment of the cells being measured. The "micropressure probe" method, in contrast, is potentially precise and accurate, but inherently difficult to perform. The micropressure method necessarily destroys the cells whose turgor is being measured. Finally, other techniques, such as the pressure-bomb method, are only suitable for whole organs and are generally characterized as single use, one-shot methods. Thus, the traditional ways of determining turgor pressure are invasive or disruptive to the cellular specimen, thereby interfering with the normal dynamics of the cell, including cellular behavior.

In contrast, the present invention relates to a method and an apparatus for measuring the contact area or contact patch between a specimen and a mechanical probe, and this can be used to determine, virtually instantaneously and repeatably, the turgor pressure in a cellular specimen. The method and apparatus can be non-invasive and non-destructive to the specimen. In cellular specimens the present invention's method can be repeated from point to point, for example, along a growing axis.

SUMMARY OF THE INVENTION

In accordance with this invention a method and an apparatus for determining the area of contact between a convex probe surface and a cellular specimen uses a transparent probe and an optical viewing path through the probe to the area of contact. The area of contact can be described as the contact area or contact patch between the objective and the specimen. In one embodiment, the specimen is located at the working distance of a microscope objective, and the probe is introduced between the objective and the specimen. A known force is applied by the probe to a deformable specimen. The amount of deformation of the specimen will depend on the force. If the probe's contact surface is of known geometry, for example spherical, and of known dimensions, the contact area between the probe's contact surface and the cellular specimen will be a function of the turgor pressure.

Contact area image information, i.e. the optical image or data descriptive of the optical image, is conveyed to an image analysis system. This calculates the contact area and consequently, permits calculation of the specimen characteristic affecting contact area.

By applying a series of known forces via the probe and measuring respective contact areas it is possible to derive data representing a plot of area versus force. This enables extrapolation of the specimen characteristic at zero force. As discussed in more detail below, when method and apparatus of the invention is used to determine turgor pressure in a cell, an extrapolation of this kind permits determination of the turgor pressure when no force is applied by the probe.

The turgor pressure of a cell is the hydrostatic pressure contained in a constraining membrane of each individual cell. Given a constant force and a spherical probe contact surface, the greater the internal pressure of the cell, the smaller will be the contact area or patch between probe and cell. In measuring this pressure in a cellular specimen, composed of one or more cells, the method and apparatus of the invention have the capability of making such measurement without invasion or destruction of the cellular specimen or any cell of the cellular specimen.

The method of nondestructively and noninvasively calculating the turgor pressure in the cellular specimen uses an appropriate proportionality relationship between the turgor pressure in a supported cell that has a substantially smooth upper surface, and the contact area between the transparent mechanical probe, having a known geometry. The contact area is viewed by a microscope, which will have a suitable support for the specimen and may have associated with it an appropriate means for illuminating the contact area, either by a substage light source and condenser, by a fiber optic light guides brought in at substantially the level of the microscope stage and providing oblique illumination at approximately ninety degrees to the optical axis of the microscope, or by epi-illumination through the objective lens itself The light source is manipulated until a clear image of the outline bordering the contact area is observed.

The term view or observe as used here is meant to include both observation by an individual using the method and apparatus of the invention and retrieving of image information optically, electrically or otherwise. For example, the apparatus for determining the contact area may include an image capturing system using a CCD camera to which the image is exported. A video frame grabber and image analysis station can be used to arrive at the actual contact area.

A force controllable mechanical probe support provides an accurately determined contact force between the probe and the specimen. The probe is an optically neutral element. In a preferred embodiment the probe's contact surface was spherical, formed by a sphere of glass, diamond, or quartz and affixed to a strip of cover glass by a drop of ultraviolet cured optical adhesive. This arrangement avoids distortion at the spherical ball surface remote from the specimen. Essentially, the contact area is being viewed through a flat window to the far surface of the ball. The force controllable mechanical probe may employ a jewel bearing system for reducing friction, e.g. one employing a sapphire or like-bearing material.

A field instrument used to measure the turgor pressure of leaves of crop plants is one application of the turgor pressure measuring embodiment of the invention. Such a device can be employed to quantify water stress on plants quickly in the field to serve as a "go-no go" gauge for irrigation, that is to say, to indicate whether or not irrigation is required.

DESCRIPTION OF THE DRAWINGS

The invention will be more readily understood from the description of a preferred embodiment that follows and from the diagrammatic figures of the drawings.

In the drawings:

FIG. 2 is a schematic view partially in section and partially in block diagram form and illustrates a transparent mechanical probe in a system to determine the contact area between the probe and a specimen;

FIG. 3 is a schematic view like that of FIG. 2 and diagrammatically illustrates an alternative means of illumination of the probe-specimen contact area.

DESCRIPTION OF THE PREFERRED EMBODIMENTS

Figure 1:
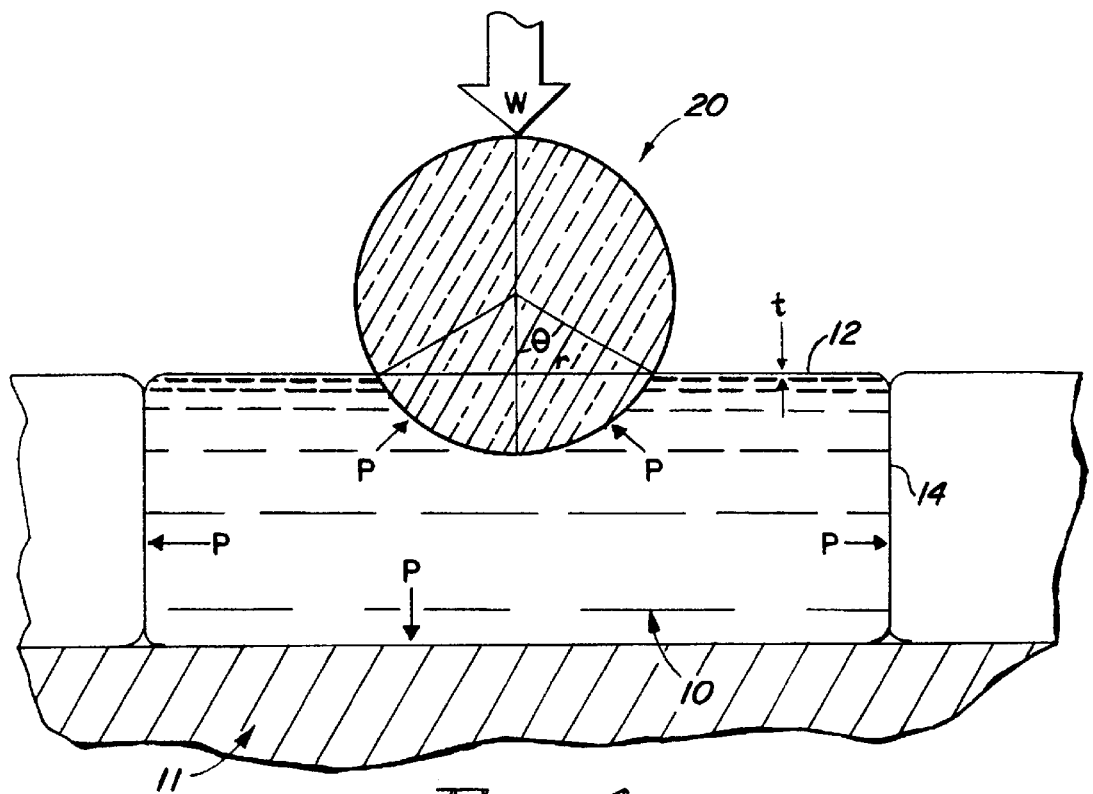
FIG. 1 is a cross-sectional view of a spherical force controllable transparent mechanical probe contacting a cellular specimen.

I. Theoretical Background for a Proportionality Relationship between the Turgor Pressure and the Contact Area of a Spherical Force Controllable Transparent Mechanical Probe Contacting a Cellular Specimen In a preferred embodiment of this invention a cellular specimen 10, shown as an individual cell, is contacted by a spherical surface of a transparent optical probe 20, as shown in FIG. 1. The individual cell is treated as a thin-walled pressure vessel to which an external load W is applied for a theoretical understanding of the invention. The cell has a substantially smooth upper surface 12. By "substantially smooth upper surface" is meant a surface not having features, such as epidermal hairs, that would interfere with a force controllable transparent optical probe's contacting that surface of the specimen.

For the general case of a thin-walled pressure vessel to which an external load is applied by means of a rigid probe, the area of the contact patch is related to the internal pressure, turgor pressure, of the individual cell by:

$$W=Ap; \tag{1}$$

wherein: W is the force applied to the cell through the force controllable transparent mechanical probe (measured in Newtons or other units of force); A is a contact area (measured in square meters or other units of area); and p is a turgor pressure (measured in Bars, Pascals or other units of pressure).

Referring to FIG. 1, where the contact surface of the probe 20 is spherical, the probe causes an indentation in the surface 12 of the pressure vessel or cell 10. There is an additional supporting force which results from the stress in the skin acting to lift the load, as shown in FIG. 1. Thus, the force acting on an indentor of this nature will be balanced by the internal pressure, turgor pressure, of the individual cell according to the relationship:

$$W=p\pi r^2+2\pi r\sigma t \sin(\theta); \tag{2}$$

wherein: W is the force applied to the cell through the force controllable transparent mechanical probe causing the indentation (measured in Newtons or other units of force); t is the cell wall thickness (measured in meters or other units of length); p is a turgor pressure (measured in Bars, Pascals or other units of pressure); σ is a stress in the cell wall (measured in Bars, Pascals or other units of pressure); R is a radius of the spherical, force-controllable transparent, mechanical probe (measured in meters or other units of length); r is a radius of the contact patch (measured in meters or other units of length); and θ is a contact angle with respect to the center of the sphere and the outline of the contact area (measured in degrees).

If one keeps the indentation of the force controllable transparent mechanical probe into the individual cell small, $\sin(\theta)$ is approximated by r/R; such that equation (2) reduces to:

$$W=p\pi r^2+2\pi r^2 \sigma t/R. \tag{3}$$

Moreover, the wall stress, σ, is related to internal pressure according to the following relationship:

$$\sigma=pD/4t; \tag{4}$$

where D is the approximate cell size (measured in meters or other units of length). Substitution of equation (4) into equation (3) produces the following relationship:

$$W=p\pi r^2(1+\tfrac{1}{2}D/R)=pA(1+\tfrac{1}{2}D/R). \tag{5}$$

Because D generally has a dimension near 50 µm and R in this case is 1000 µm, equation (5) can be reduced for these specific dimensions to the following relationship:

$$W=pA\times 1.05. \tag{6}$$

If a spherical probe is applied to a surface of a cellular specimen that comprises a multicellular tissue, and the probe contact area spans more that one cell, the additional support offered by the anticlinal walls may be considered. The internal support of the anticlinal walls could cause a decrease in the contact area and an apparent increase in the measured turgor pressures. However, if the additional support of the anticlinal walls within the contact area is negligible with respect to the turgor pressure, then the contact area is related to the average turgor pressure of the cells in contact with the probe. Considering the delicate nature of the cell walls and the fact that the experimentally measured pressures were consistently lower than would otherwise be predicted it is presently believed that the anticlinal walls may at this time be safely ignored.

Additionally, there is the possibility of compartmentalization in a cellular specimen composed of a multicellular tissue resulting in a lack of fluid mobility. under the probe. This lack of fluid mobility could result in higher pressures at the center of the probe producing an apparent increase in the cell pressure.

The thin-walled model discussed above for the embodiment described here does not incorporate any correction for either subsurface support or fluid compartmentalization, but corrections for these effects may be included where necessary.

II. Method and Apparatus for the Measurement of Turgor Pressure

To determine specimen turgor pressure, an accurate measurement is made of the contact area between the cell 10 and the force-controllable, transparent mechanical probe 20, of known geometry. Such probe may have, but is not limited to, a contacting surface that is spherical, hemispherical, or cylindrical. A calibrated load is applied to the specimen via the probe by a suitable accurate force producing mechanism. The specimen 10 is supported from below by support 11. The transparent probe 20 may be made of any light transparent material, such as, but not limited to, glass, diamond, and quartz. The cellular specimen may be composed of a plurality of eukaryotic, either plant or animal, cells; a plurality of procaryotic cells; a plurality of organic micelles; a plurality of inorganic ricelles; or a single cell or micelle, provided that the cellular specimen includes a constraining membrane 14.

The probe 20 is small enough to be inserted directly beneath an objective lens 32 of a standard compound microscope 30 as shown in FIG. 2. The particular probe of this embodiment includes a strip 22 of No. 2 cover glass, acting as a support beam, and a 1 millimeter diameter ball lens 24 cemented to the strip 22 with a drop of ultraviolet cured optical adhesive 26. The probe is thus inserted into the optical path of the microscope 30. There it is manipulated into the working distance of the objective 32, and carefully lowered onto the cellular specimen 10, supported by the microscope stage 11. The adhesive prevents distortion at the spherical surface remote from the specimen.

The ball lens 24 serves as a spherical mechanical indentor, while at the same time it provides an optically neutral, flat window at the upper surface through which the contact area can be observed directly. Because the image formed by the microscope is of the tissue in contact with the lower surface of ball lens itself, the optical properties of the ball lens do not contribute to total magnification of the system. This results in a reasonably clear observable image of the cell or cells of specimen 10 on which the ball lens is resting.

In an actual embodiment, the total mass of the ball lens 24 and its support 22 was 150 milligrams. The actual controlled force applied to the cellular specimen 10 was 45 milligrams times gravity. For the purpose of applying the controlled force, any accurate force producing mechanism 35 may be coupled to the probe.

As shown in part in FIG. 2, the cellular specimen 10 and the contact patch formed with the probe 20 are transilluminated by a standard substage condenser 41, and light source 40. Alternatively, as illustrated in FIG. 3, illumination may be by fiber-optic light guides 42 brought in at the substantially the level of the microscope stage, providing oblique illumination at approximately ninety degrees to the optical axis of the microscope. In still another alternative, illumination may be by epiillumination through the objective lens itself These means for illumination are manipulated to provide sufficient contrast to reveal the contact area.

In the preferred embodiment, as shown in FIG. 2, the image of the contact area is exported to an image capturing system, via, for example, a CCD camera 44, thence to a video frame grabber 46 and finally to an image analysis station 48 where the contact area is determined directly. The image analysis station is suitably a computer running OPTIMAS™ or another commercially available image analysis program. The area may also be determined directly by the use of an eye piece incorporating a measuring reticle.

Measurements of neighboring cells in the cellular specimen 10 can be rapidly assessed using a translation device 50 as shown in FIG. 2. The translation device is movable in either one, two, or three dimensions. The translation device allows the probe 10 to slide over the surface of the specimen 20. Multiple measurements can be taken as fast as the probe can be moved to another cell and the image captured using the image analysis system. The capturing of the image is generally accomplished by clicking the "Freeze" button on the image analysis system.

The turgor pressure is then directly calculated from the observed and measured contact area using the relationships described in Equations (1) through (6). By repeating the measurement of the contact area at a variety of different forces of indention, data representing a plot of turgor pressure versus force are developed. The turgor pressure at zero force thus may be extrapolated.

The method and apparatus described above was used to determine if the measured areas and the calculated turgor pressures varied linearly with cellular osmotic pressure. In this test, peeled patches of onion leaf-base adaxial epidermis were incubated in mannitol solutions of varying osmolality, where one osmole equals one mole of nonpermeating molecules plus ions per liter. These solutions corresponded to 1 Bar increments in osmotic pressure from distilled water to −6 Bars. A slight meniscus of liquid around the contact patch facilitated observation of the contact patch outline.

Figure 4:
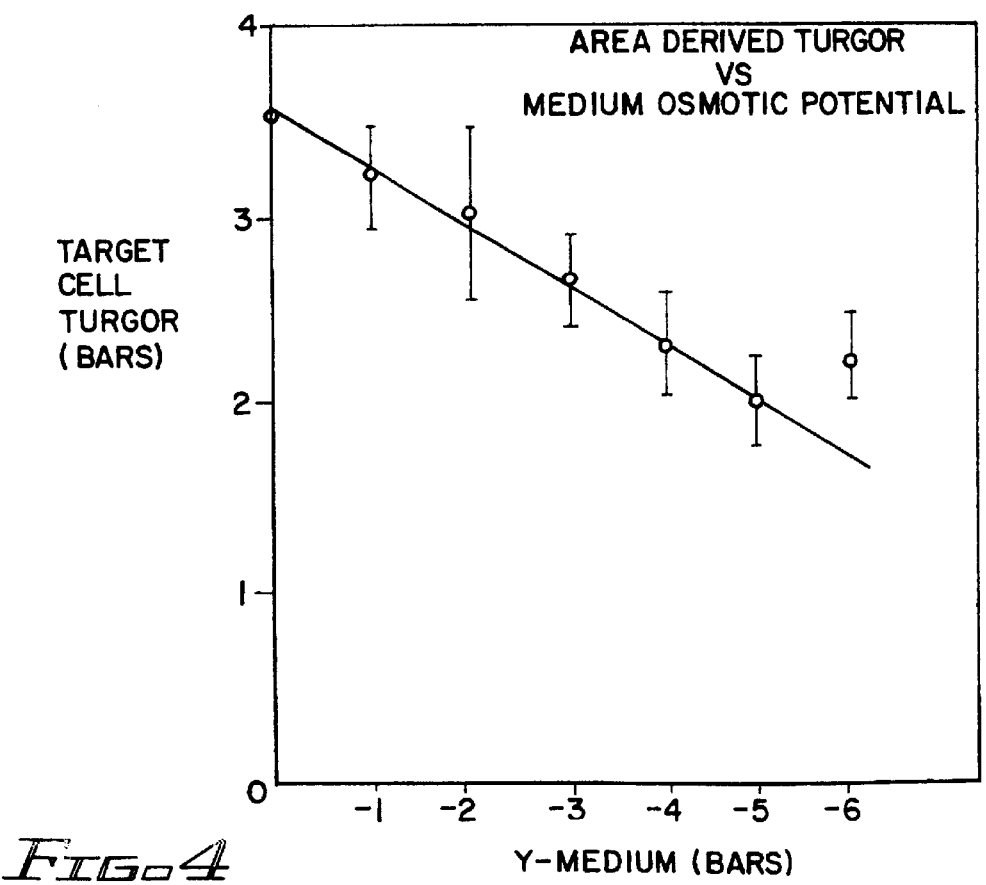
FIG. 4 is a graphical illustration plotting a relationship between contact area derived turgor pressure (Bars) and medium osmotic pressure (Bars).

FIG. 4 shows a plot of the turgor pressure, calculated by the contact area method, against the ambient osmotic pressure of the incubating medium. This plot shows a basically linear relationship between the calculated turgor pressure of the target cells, and the osmolarity (water potential) of the incubating medium. Sources of scatter in the graph may include: inaccuracies in the method employed, real differences in turgor pressure from cell to cell in the cellular specimen, and the presence of the contact meniscus which inflates the area and consequently lowers the apparent turgor pressure.

It should be noted that several factors can contribute to real differences in turgor pressure from cell to cell in cellular specimen. These factors include: deformations of the cellular specimen resulting from constraining a spherical layer of cells onto a flat microscope slide which can result in local strains that could either act to raise or lower the turgor pressure in the cells, and the geometry of individual cells comprising the cellular specimen can also give rise to different measured turgor pressures.

A hand held version of the turgor pressure measuring apparatus may be fabricated. This would include the same elements as the described embodiment. The addition of a portable power supply to power the means for illumination is envisioned. In certain applications natural light may suffice to illuminate the contact patch.

Whereas a specific preferred embodiment of this invention has been described it will be understood that variations and modifications may be made without departure from the spirit and scope of the invention as set forth in the appended claims.

What is claimed is:

1. A method of determining the turgor pressure of a cellular specimen, comprising:
    (a) providing a mechanical probe with a convex surface;
    (b) contacting a cellular specimen with the convex surface of the probe;
    (c) measuring an area of contact between the probe and the cellular specimen; and
    (d) calculating the turgor pressure of the cellular specimen using the measured area of contact.

2. The method of determining the turgor pressure of a cellular specimen according to claim 1, further comprising: applying a known force to the cellular specimen causing the probe to deform the cellular specimen.

3. The method of determining the turgor pressure of a cellular specimen according to claim 2, wherein the mechanical probe is transparent and further comprises a convex surface.

4. The method of determining the turgor pressure of a cellular specimen according to claim 3, wherein the transparent mechanical probe with a convex surface comprises a ball lens glued to an optically transparent support beam using an optical adhesive whose index of refraction matches the optically transparent support beam.

5. The method of determining the turgor pressure of a cellular specimen according to claim 2, wherein the measuring of step (c) is accomplished by viewing the area of contact with a means for magnification.

6. The method of determining the turgor pressure of a cellular specimen according to claim 2, wherein the measuring of step (c) is accomplished by viewing the area of contact with an optical microscope.

7. The method of determining the turgor pressure of a cellular specimen according to claim 2, further comprising: conveying to an image analysis system information taken from the measured contact area between the probe and the cellular specimen.

8. The method of determining the turgor pressure of a cellular specimen according to claim 2, further comprising: applying a plurality of known forces to the specimen; and determining the area of contact from the application of each such force.

9. The method of determining the turgor pressure of a cellular specimen according to claim 8, further comprising the step of extrapolating from the applied forces and respective contact areas to determine the turgor pressure.

10. The method of determining the turgor pressure of a cellular specimen according to claims 1, 2, 7, 8, or 9, further comprising:

(i) locating the cellular specimen at the working distance of a microscope objective;
(ii) introducing the probe between the objective and the cellular specimen; and
(iii) measuring the area of contact of step (c) by viewing the area of contact through the microscope.

11. The method of determining the turgor pressure of a cellular specimen according to claim 2, 8 or 9, wherein the step (d) of calculating the turgor pressure comprises calculating the turgor pressure using substantially the relationship:

$$W = pA \times 1.05,$$

where p is the turgor pressure, A is the area of contact, and W is the force applied to the cellular specimen.

12. The method of determining the turgor pressure of a cellular specimen according to claim 2, further comprising contrasting the area of contact using a means for illumination.

13. The method of determining the turgor pressure of a cellular specimen according to claim 12, wherein contrasting the area of contact using a means for illumination further comprises transilluminating a path of observation.

14. The method of determining the turgor pressure of a cellular specimen according to claim 12, wherein contrasting the area of contact using a means for illuminating the area of contact further comprises directing light obliquely to a path of observation.

15. The method of determining the turgor pressure of a cellular specimen according to claim 12, wherein contrasting the area of contact using a means for illumination further comprises providing epi-illumination through an objective lens.

* * * * *